United States Patent
Yoshida (10) Patent No.: US 10,546,000 B2
(45) Date of Patent: Jan. 28, 2020

(54) INFORMATION PROCESSING APPARATUS AND INFORMATION PROCESSING SYSTEM

(71) Applicant: FANUC CORPORATION, Yamanashi (JP)

(72) Inventor: Nobuhiro Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/017,056

(22) Filed: Jun. 25, 2018

(65) Prior Publication Data

US 2019/0005119 A1    Jan. 3, 2019

(30) Foreign Application Priority Data

Jul. 3, 2017    (JP) .................................. 2017-130142

(51) Int. Cl.
  *G06F 16/00*    (2019.01)
  *G06F 16/31*    (2019.01)
  (Continued)

(52) U.S. Cl.
  CPC .......... *G06F 16/313* (2019.01); *G06F 3/0481* (2013.01); *G06F 3/0482* (2013.01);
  (Continued)

(58) Field of Classification Search
  CPC combination set(s) only.
  See application file for complete search history.

(56) References Cited

U.S. PATENT DOCUMENTS

2012/0072862 A1*    3/2012    Hasegawa ............... G06F 9/451
                                                          715/781
2014/0104654 A1*    4/2014    Hirota ................ H04N 21/4312
                                                          358/1.15
(Continued)

FOREIGN PATENT DOCUMENTS

CN    104102464 A    10/2014
CN    104272307 A    1/2015
(Continued)

OTHER PUBLICATIONS

Japanese Office Action dated Oct. 16, 2018, for Japanese Patent Application No. 2017-130142.
(Continued)

*Primary Examiner* — Alexander Khong
(74) *Attorney, Agent, or Firm* — Karceski IP Law, PLLC (57) ABSTRACT

An information processing apparatus includes a storage unit storing screens including display item and display item names or screen names, a display unit, and a control unit. The control unit causes the display unit to display a candidate of the display item names or the screen names. When the displayed display item name or screen name is selected, the control unit searches through the storage unit for the screen including the selected display item name or the screen corresponding to the selected screen name and causes the display unit to display the screen and the storage unit to store a transition history up to the displayed screen. When the recorded screen is being displayed, the control unit causes the display unit to display, as a candidate, the display item name or the screen name included in the screen displayed subsequently to the screen being displayed based on the transition history.

5 Claims, 8 Drawing Sheets

(51) Int. Cl.
   *G06F 3/0482* (2013.01)
   *G06F 3/0481* (2013.01)
   *G06F 16/335* (2019.01)
   *G06F 16/338* (2019.01)
   *G06F 16/34* (2019.01)
(52) U.S. Cl.
   CPC .......... *G06F 16/337* (2019.01); *G06F 16/338* (2019.01); *G06F 16/345* (2019.01)

(56) References Cited

U.S. PATENT DOCUMENTS

| 2015/0088864 A1 | 3/2015 | Takigawa et al. |
| 2015/0202773 A1 | 7/2015 | Nagashima |
| 2016/0202884 A1 | 7/2016 | Ohki et al. |

FOREIGN PATENT DOCUMENTS

| CN | 104423879 A | 3/2015 |
| EP | 2907627 A2 | 8/2015 |
| JP | H08137648 A | 5/1996 |
| JP | 2010041238 A | 2/2010 |
| JP | 2010211483 | 9/2010 |
| JP | 2011187002 | 9/2011 |
| JP | 2015136762 | 7/2015 |
| JP | 2016197368 | 11/2016 |
| WO | 2010067618 A1 | 6/2010 |

OTHER PUBLICATIONS

Chinese Office Action dated Jun. 5, 2019, for Chinese Patent Application No. 201810690168.8.

* cited by examiner

| TRANSITION HISTORY | USER | MECHANICAL SYSTEM CONFIGURATION | DEVICE STATUS | DATE | SEASON |
|---|---|---|---|---|---|
| SCREEN A→SCREEN B→SETTING ITEM B21→SCREEN D | X1 | R1 | P1 | 1/1 | WINTER |
| SCREEN A→SCREEN B→SCREEN C→SCREEN D | X1 | R1 | P1 | 1/1 | WINTER |
| SCREEN A→SCREEN D→SCREEN C→SCREEN D | X1 | R1 | P1 | 1/1 | WINTER |
| SCREEN A→SETTING ITEM C21 | X1 | R1 | P1 | 1/1 | WINTER |
| SCREEN B→SCREEN C | X1 | R1 | P3 | 7/1 | SUMMER |
| SCREEN B→SCREEN C | X2 | R1 | P3 | 7/1 | SUMMER |
| SCREEN B→SCREEN F | — | R1 | — | 7/1 | SUMMER |
| SCREEN B→SCREEN C | X2 | R1 | P3 | 7/1 | SUMMER |
| SCREEN B→SCREEN C | X2 | R1 | P3 | 7/1 | SUMMER |
| SCREEN B→SCREEN F | X2 | | | — | — |

INFORMATION PROCESSING APPARATUS AND INFORMATION PROCESSING SYSTEM

CROSS-REFERENCE TO RELATED APPLICATIONS

This application is based on and claims priority to Japanese Patent Application No. 2017-130142, filed on Jul. 3, 2017, the entire content of which is incorporated herein by reference.

FIELD OF THE INVENTION

The present invention relates to information processing apparatuses and information processing systems.

BACKGROUND OF THE INVENTION

In a known information processing apparatus in the related art, when various setting items, such as the coordinate system and system variables, are to be set in a control device for a device such as a robot or a machining device, many setting items are hierarchically organized by being grouped into similar item groups, and a selection screen for allowing selection of a setting item for each hierarchical layer is displayed from a shallow hierarchical layer toward a deep hierarchical layer so that setting items are sequentially selected, whereby a target setting item is set (for example, see Japanese Unexamined Patent Application Publication No. 2015-136762).

SUMMARY OF THE INVENTION

The present invention provides the following solutions.

An aspect of the present invention provides an information processing apparatus including: a storage unit that stores a plurality of screens including at least one display item and that also stores display item names or screen names; an input unit that allows a user to perform an input; a display unit; and a control unit. The control unit causes the display unit to display a candidate of at least one of the display item names or the screen names stored in the storage unit. When the displayed display item name or screen name is selected via the input unit, the control unit searches through the storage unit for the screen including the selected display item name or the screen corresponding to the selected screen name and causes the display unit to display the screen and the storage unit to store a transition history up to the displayed screen. When the screen recorded in the transition history stored in the storage unit is being displayed, the control unit causes the display unit to display, as a candidate, the display item name included in the screen displayed subsequently to the screen being displayed on the basis of the transition history or the screen name of the screen displayed subsequently to the screen being displayed on the basis of the transition history.

Another aspect of the present invention provides an information processing system including a plurality of the aforementioned information processing apparatuses and a network that connects the information processing apparatuses. The candidate of each of the information processing apparatuses is displayed based on the one or more transition histories stored in the storage unit of each information processing apparatus connected via the network.

DESCRIPTION OF EMBODIMENT(S) OF THE INVENTION

An information processing apparatus 1 according to an embodiment of the present invention will be described below with reference to the drawings.

The information processing apparatus 1 according to this embodiment is, for example, a control apparatus for a robot (i.e., a setting target) and is used when setting (displaying) many setting items (i.e., display items), such as the coordinate system of the robot and system variables.

Figure 1:
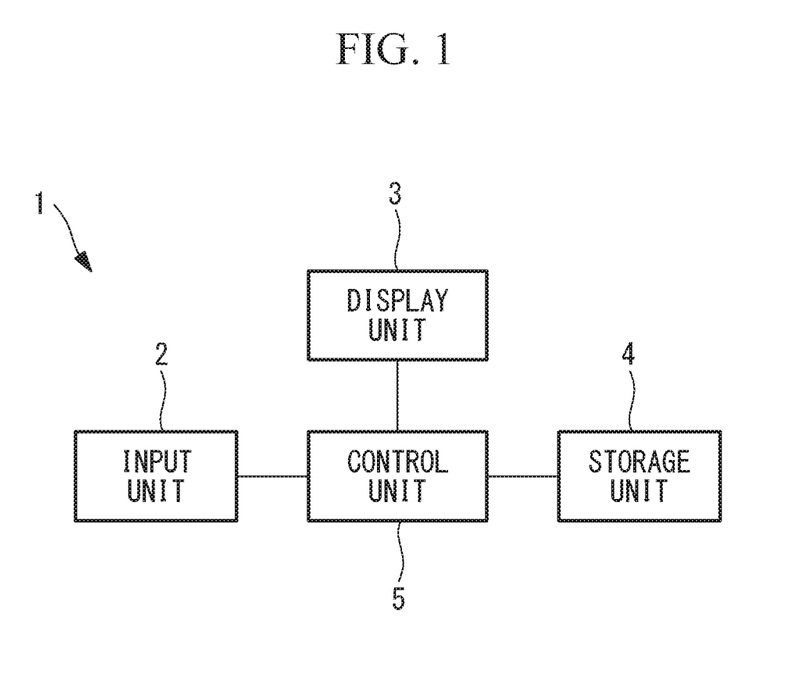
FIG. 1 is a block diagram illustrating an information processing apparatus according to an embodiment of the present invention.

As shown in FIG. 1, the information processing apparatus 1 includes an input unit 2, a display unit 3, a storage unit 4, and a control unit 5.

The input unit 2 used may be a freely-chosen operation input device, such as a control panel, a keyboard, a mouse, or a touchscreen.

The display unit 3 is a display.

Figure 2:
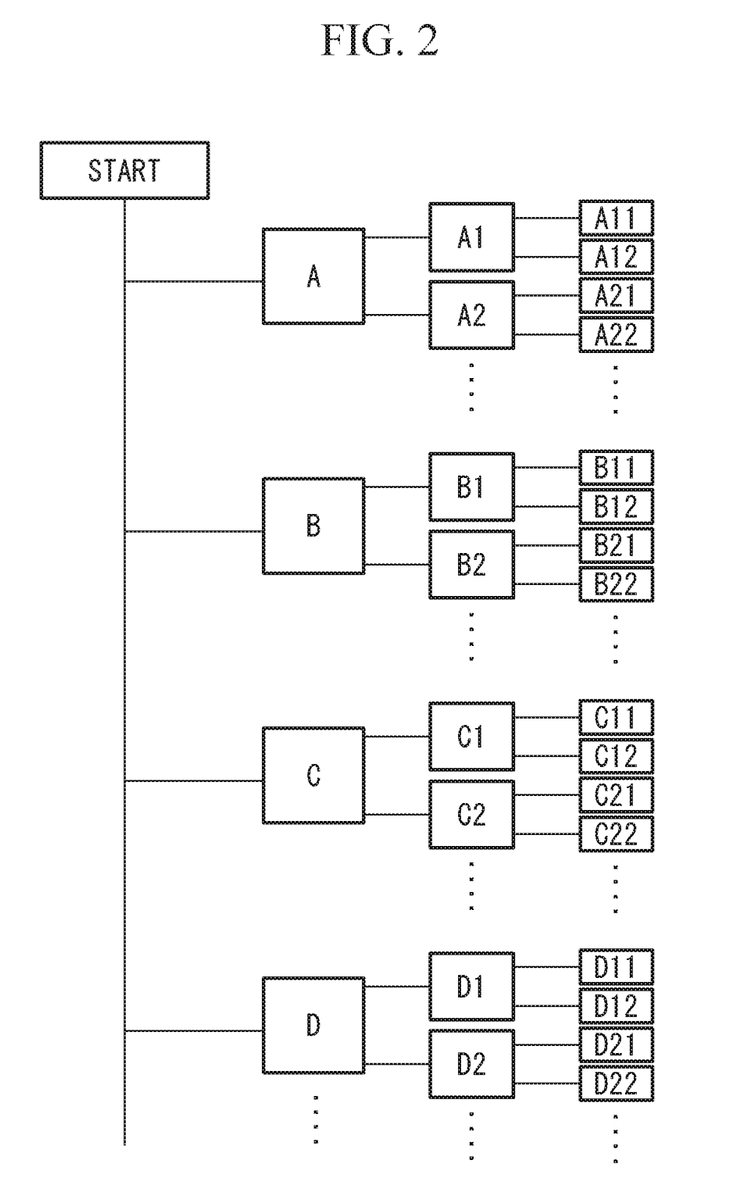
FIG. 2 illustrates an example of a hierarchical structure of screens and setting items stored in a storage unit of the information processing apparatus in FIG. 1.

The storage unit 4 is a memory and hierarchically stores, for example, a plurality of screens A, A1, A2, B, B1, B2, C, C1, C2, D, D1, and D2 including one or more setting items A11, A12, A21, A22, B11, B12, B21, B22, C11, C12, C21, C22, D11, D12, D21, and D22, as shown in FIG. 2, as well as setting item names of the setting items A11, A12, A21, A22, B11, B12, B21, B22, C11, C12, C21, C22, D11, D12, D21, and D22, screen names of the screens A, A1, A2, B, B1, B2, C, C1, C2, D, D1, and D2, and a screen transition history to be described later.

Figure 3:
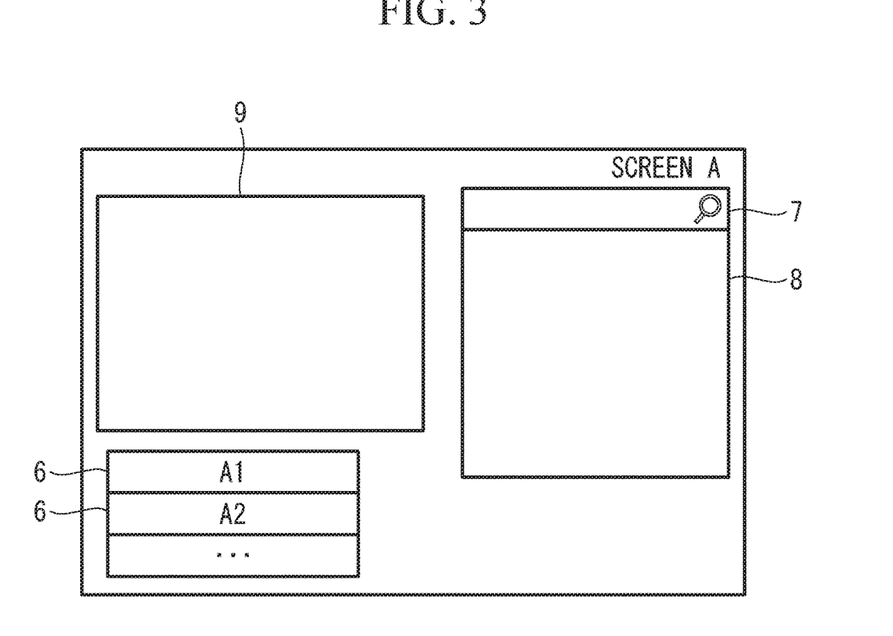
FIG. 3 illustrates an example of a screen displayed by the information processing apparatus in FIG. 1.

As shown in FIG. 3, each of the screens A, A1, A2, B, B1, B2, C, C1, C2, D, D1, and D2 has selection buttons 6 for selecting the one or more setting items or screens and is also provided with a search box (search input section) 7 where a search string for searching for a freely-chosen setting item or screen is input. When a cursor is set on the search box 7 or at least one character to be searched for is input thereto, a candidate display column appears. In FIG. 3, reference sign 8 denotes a candidate display column in which a setting item name or a screen name is displayed, and reference sign 9 denotes an information display column in which information handled by the information processing apparatus 1 (e.g., the status of a mechanical system, such as the robot) is displayed.

Figure 4:
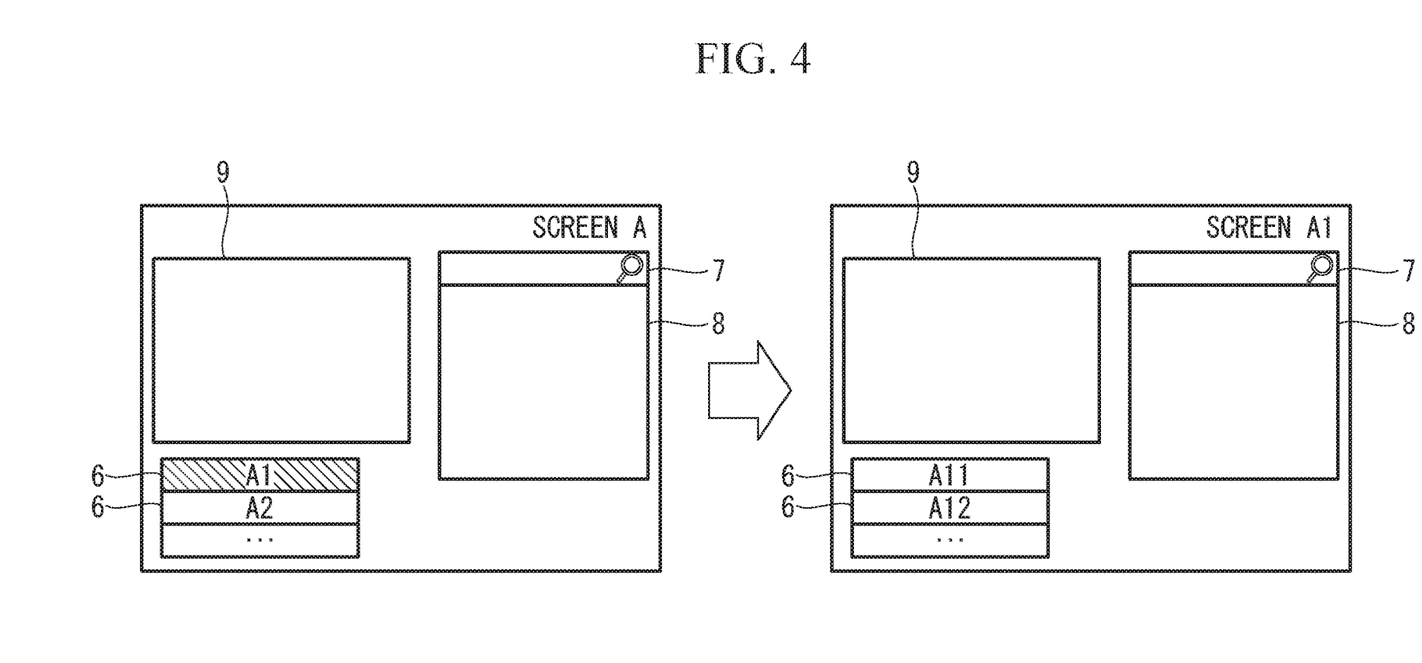
FIG. 4 illustrates switching of screens when a setting item is selected on the screen in FIG. 3.

The control unit 5 includes a processor (not shown). As shown in FIG. 4, when one of the selection buttons 6 in the screen A displayed on the display unit 3 is pressed, the control unit 5 causes the display unit 3 to display the screen A1 associated with the selection button 6. A user can set target setting items A11 and A12 in accordance with the displayed screen A1 or can select another screen A2 by using the corresponding selection button 6. Accordingly, by sequentially selecting the screens A1 and A2 using the selection buttons 6, it is possible to switch between the screens A1 and A2 with a small number of operations. FIG. 4 illustrates an example where the diagonally-shaded selection button 6 is pressed.

Figure 5:
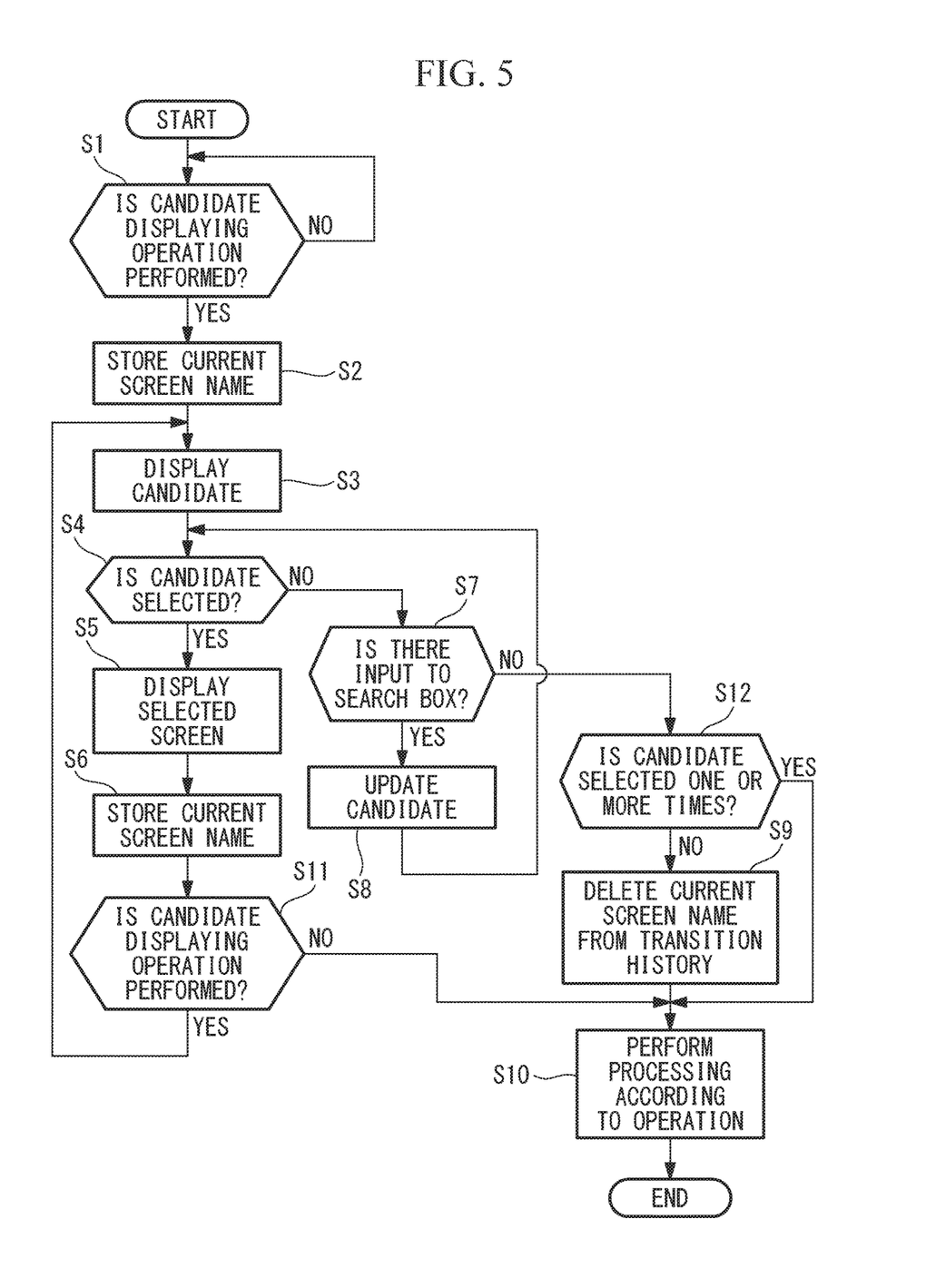
FIG. 5 is a flowchart illustrating the operation of a control unit of the information processing apparatus in FIG. 1.

As shown in FIG. 5, the control unit 5 determines whether or not a candidate displaying operation is performed by the user (step S1). A candidate displaying operation refers to an operation performed on the input unit 2 or an elapse of a certain time period.

When a candidate displaying operation is performed, the control unit 5 causes the storage unit 4 to store the current setting item name or screen name in the screen transition history (step S2).

Then, the control unit 5 causes the display unit 3 to display the candidate display column 8, uses the setting item name or screen name being displayed as a search key to search for a transition history including the search key from the screen transition history stored in the storage unit 4, and causes the candidate display column 8 to display, as a candidate, a setting item name or screen name displayed subsequently to the setting item name or screen name used as the search key (step S3).

The control unit 5 determines whether or not the candidate displayed in the candidate display column 8 is selected (step S4). If the candidate is selected, the control unit 5 causes the display unit 3 to display a screen corresponding to the selected candidate (step S5), causes the storage unit 4 to store the current screen in the transition history (step S6), and determines whether or not a candidate displaying operation is performed again by the user (step S11). If a candidate displaying operation is performed, the process from step S3 is repeated.

If the candidate displayed in the candidate display column 8 is not selected in step S4, it is determined whether or not a character is input to the search box 7 by the user (step S7). If a character is input to the search box 7 by the user, the control unit 5 searches through the storage unit 4 for a candidate of a setting item name or screen name including the input character and updates the display of the candidate display column 8 (step S8). The process then returns to step S4.

If the candidate displayed in the candidate display column 8 is not selected in step S4 and another kind of operation, such as pressing one of the selection buttons 6 displayed on the screen, is performed without any input to the search box 7, it is determined whether or not a candidate has been selected one or more times (step S12). If a candidate has been selected one or more times, processing according to the operation is performed (step S10). If not, the current setting item name or screen name is deleted from the transition history stored in the storage unit 4 in step S2 (step S9), and processing according to the operation is performed (step S10).

If a candidate displaying operation is not performed in step S11 and another kind of operation is performed instead, processing according to the operation is similarly performed (step S10).

The operation of the information processing apparatus 1 according to this embodiment having the above-described configuration will be described below.

When setting a target setting item or displaying a target screen by using the information processing apparatus 1 according to this embodiment, the user performs a certain candidate displaying operation on the currently-displayed screen (step S1), so that the current screen is stored in the transition history (step S2).

For example, when a candidate displaying operation is performed on the screen A, the screen A is stored in the transition history.

The candidate display column 8 is displayed as a result of the candidate displaying operation. By using the setting item name or screen name being displayed as a search key, a search for a transition history including the search key from the screen transition history stored in the storage unit 4 is performed. The candidate display column 8 then displays, as a candidate, a setting item name or screen name displayed subsequently to the setting item name or screen name used as the search key (step S3).

For example, if there is a transition history in which the screen C was displayed and selected as a candidate in the screen A in the past, a screen name C is displayed in the candidate display column 8 in a state where there is no input to the search box.

If the user selects the screen name C in the candidate display column 8 (step S4), the screen C is displayed on the display unit 3 (step S5), and "screen A→screen C" is stored as a transition history in the storage unit 4 (step S6).

If a character is input to the search box 7 without the user selecting a candidate in the candidate display column 8 (step S7), a setting item name or screen name including the input character is searched for as a candidate, and the display in the candidate display column 8 is updated (step S8).

For example, if "D" is input to the search box on the screen A, a setting item name or screen name including "D" is searched for through the storage unit 4 and is displayed in the candidate display column 8. If the user selects the screen D in the candidate display column 8, a screen corresponding to the screen D is displayed on the display unit 3, and "screen A→screen D" is stored as a transition history in the storage unit 4. Likewise, in a case where the screen corresponding to the screen D is displayed, it is determined whether or not a candidate displaying operation is performed by the user (step S11). If a candidate displaying operation is performed, the process from step S3 is repeated.

Accordingly, in the information processing apparatus 1 according to this embodiment, if a screen is changed by selecting a candidate of a setting item name or screen name displayed on the display unit 3, the screen transition history is stored, and if a screen recorded in the transition history is subsequently displayed, a setting item name or screen name included in a screen transitioned as a result of a previous search through the currently-displayed screen or in a screen transitioned by selecting a candidate is displayed as a candidate. This is advantageous in that, by selecting this candidate, a target setting item or screen can be advantageously reached quickly with a smaller number of operations than in a case where hierarchically-organized setting items or screens are sequentially switched by using the selection buttons 6.

Furthermore, since the display of a candidate changes in accordance with the currently-displayed screen, a more accurate candidate is advantageously displayed than in the case where a candidate is displayed in accordance with a simple search history.

In this embodiment, all candidates are treated equally without being given priority levels. Alternatively, the candidates may be given priority levels and displayed in the candidate display column 8.

For example, classification information including at least one of user-related information, information related to a connected device, and information related to the timing at which a screen is displayed may be input or acquired, and the transition history may be stored in association with the classification information.

Then, on the basis of the transition history stored in association with the input or acquired classification information, the control unit 5 may calculate a selection frequency at which a setting item name or screen name is selected, and may calculate a frequency evaluation value by assigning a weight to the calculated selection frequency by the classification information.

By displaying candidates in the candidate display column 8 in the order of descending frequency evaluation values, the user may select a candidate most suitable for the current conditions. This is advantageous in that a target setting item or screen can be reached more quickly.

Examples of the user-related information include a user ID, username, affiliation, rank, qualification, length of service, position, age, and sex.

Examples of a connected device include a computer, a robot, a machining center, a lathe, a composite machining device, a numeral control device, a communication device, and components thereof (such as a central processing unit (CPU) and a motor).

The term "device" refers to all devices connected directly or via a network to the information processing apparatus 1.

Examples of the information related to a connected device include a device name, manufacturer, date of manufacture, installed location, operation start date, temperature, humidity, alarm status of each device, operational status of each device (at the time when the device is considered for application, at the time of activation, at the time of operation and maintenance, etc.), software installed in each device, and version number of software installed in each device. Whether it is the time when the device is considered for application or not is determined based on whether simulation is being performed in the computer. Whether it is the time of activation is determined based on whether a manual operation is being performed. Whether it is the time of operation and maintenance is determined based on whether a program is being executed or based on the length of the execution time.

Examples of the timing-related information include a time point, a time frame, the day of the week, and the season.

Figure 6:
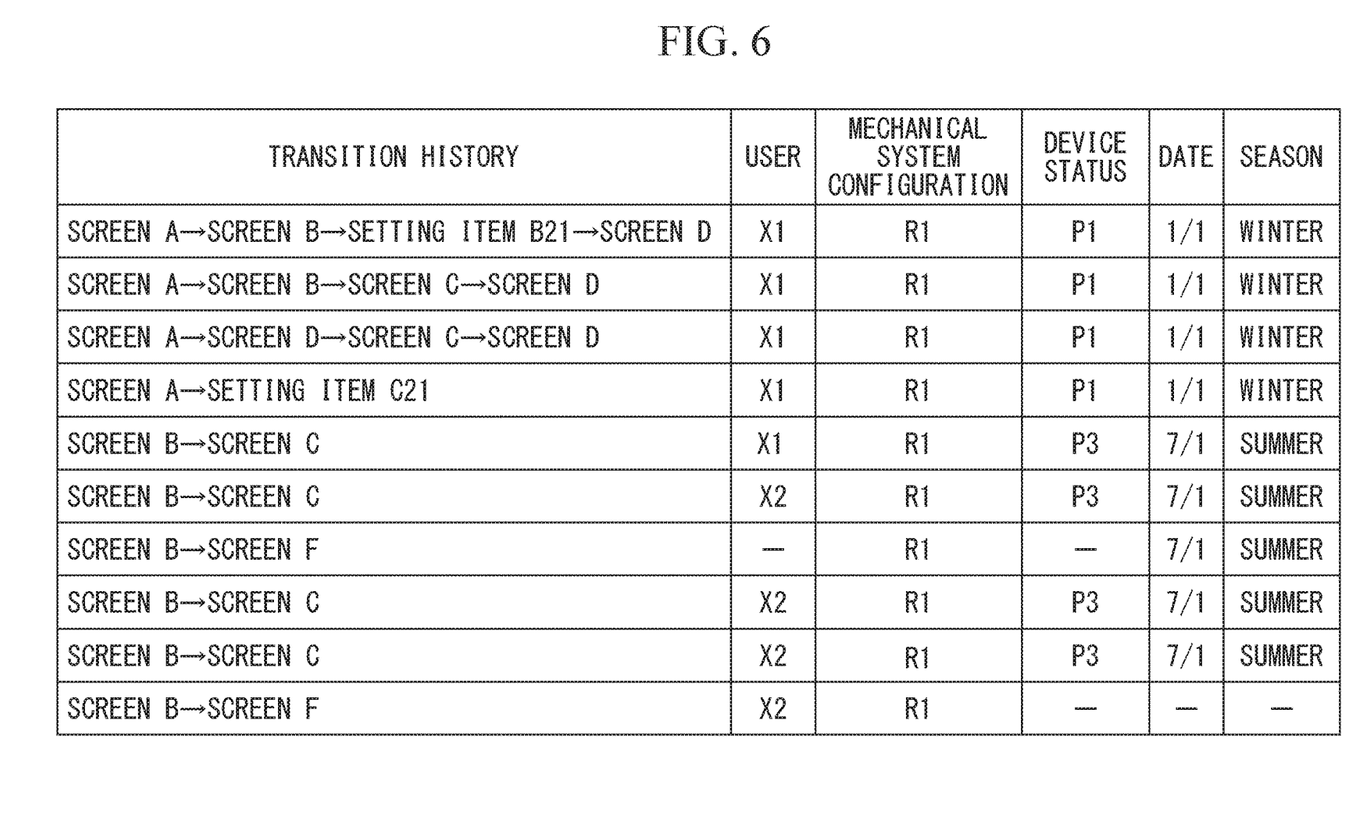
FIG. 6 illustrates an example of data, such as a transition history, stored in the storage unit of the information processing apparatus in FIG. 1, the history being newer toward the bottom.

For example, the following description with reference to FIG. 6 relates to an example where the screen transition history, user information, device information, device status, date, and season are stored in association with one another.

(1) First, a case where the currently-displayed screen is "screen B" and the transition history being currently recorded is "screen B" will be described.

Calculation 1

When data containing "screen B→" in the screen transition history is extracted and a frequency H1 of each setting item and screen is calculated, the calculated values indicate that the setting item B21 is selected once, the screen C is selected five times, and a screen F is selected twice.

Calculation 2

When data containing "screen B→" in the screen transition history and in which the user information is "user X1" is extracted and a frequency H2 of each screen is calculated, the calculated values indicate that the setting item B21 is selected once and the screen C is selected twice.

Calculation 3

When data containing "screen B→" in the screen transition history and in which the user information is "user X2" is extracted and a frequency H3 of each screen is calculated, the calculated values indicate that the screen C is selected three times and the screen F is selected once.

Calculation 4

When data containing "screen B→" in the screen transition history and in which the user information is blank is extracted and a frequency H4 of each screen is calculated, the calculated values indicate that the screen F is selected once.

Calculation 5

When data containing "screen B→" in the screen transition history and in which the configuration of a machine system is "robot R1" is extracted and a frequency H5 of each screen is calculated, the calculated values indicate that the setting item B21 is selected once, the screen C is selected five times, and the screen F is selected twice.

Calculation 6

In a manner similar to calculation 1 to calculation 5, a frequency Hn for each classification is calculated with regard to each of the device status, date, and season.

Then, the frequency of each screen is weighted to the results of calculation 1 described above to calculation n so as to calculate a frequency evaluation value H in the following manner:

$$H = a1 \times H1 + a2 \times H2 + \ldots + an \times Hn$$

where $a1$ to $an$ each denote a real number indicating a weighting factor, which may be set in advance or may be designated by the user.

For example, in a case where it is desired that candidate display be performed with reference to information about a user X1 alone, the real numbers may be set as follows: $a1=0$, $a2 \neq 0$, $a3=0$, . . . , $an=0$.

Furthermore, if the device status is ascertained and, for example, candidates are displayed when an alarm P1 is occurring in the robot R1, the weighting factor may be automatically adjusted such that the screen transition history corresponding to when the alarm P1 is occurring in the robot R1 is highly evaluated.

With regard to the timing, the user may designate a time period, and the screen transition history of the designated time period alone may be aggregated and displayed.

Then, the candidates may be displayed in the candidate display column 8 in descending order of the calculated frequency evaluation value H of each setting item name or screen name.

Consequently, the user can readily select a more appropriate setting item name or screen name in accordance with the conditions, which is advantageous in that a target setting item or screen can be reached more quickly.

(2) The following description relates to a case where the currently-displayed screen is "screen B" (i.e., when the screen transition history being currently recorded is "screen A→screen B→").

First, instead of extracting the data containing "screen B→" at the calculation stage in the example of (1), data containing "screen A→screen B→" is extracted, and the frequency of each setting item name or screen name is evaluated. Subsequently, an evaluation process is performed by assigning weights to the frequency evaluation of each setting item name or screen name in (1) and the frequency evaluation of each setting item name or screen name in (2).

Then, the candidates may be displayed in the candidate display column 8 in descending order of the weighted and calculated frequency evaluation values H.

Consequently, when there are setting items to be set or screens to be displayed in a sequential process, setting item names to be set or screen names to be displayed in the sequential process are preferentially displayed as candidates, so that target setting items or screens can be advantageously reached one after another with a smaller number of operations than in a case where hierarchically-organized setting items or screens are sequentially switched.

In a candidate-display setting screen, conditions with regard to elements including "user-related information", "information related to a device connected to the information processing apparatus 1", and "timing-related information" may be designated, and the weights may be changed based on the conditions.

Furthermore, several weighting patterns may be set in advance and may be selectable. For example, the weighting patterns may be set by a product developer, system designer, system operator, system maintainer, and so on.

Furthermore, the information processing apparatus 1 may be set to automatically assign a weight in accordance with the status of a device from which information is to be collected. For example, if it is determined that a device is being considered for application, the weights may be changed such that the screen transition history at the time of consideration for application is highly evaluated.

Furthermore, instead of collectively storing the entire screen transition history, as shown in FIG. 6, the screen transition history may be stored separately for each item of classification information.

Moreover, a fixed number of items of the screen transition history may be stored up to the latest item. When the fixed number of items is exceeded, the older items of the screen transition history may be deleted.

For example, in a case where the device status is selected as the classification information and the fixed number of items is three, the following items of data are included in the screen transition history. In this case, the following items of data are recorded with the filename "alarm P1 has occurred in robot R1".
Screen A→Screen B→Screen C→Screen D
Screen A→Screen D→Screen C→Screen D
Screen A→Setting Item C21

Moreover, the following items of data are recorded with the filename "alarm P3 has occurred in robot R1" in the screen transition history.
Screen B→Screen C
Screen B→Screen C
Screen B→Screen C Furthermore, the following items of data are recorded with the filename "no alarm has occurred in robot R1" in the screen transition history.
Screen B→Screen F
Screen B→Screen F In this case, files are generated for the number of types of alarms, and all of these files will collectively be referred to as "screen transition history".

In the case where the screen transition history is as described above and a transition is made from the screen A to a screen G through candidate selection in a state where an alarm P1 has occurred in the robot R1, the screen transition history is as follows.
Filename: "alarm P1 has occurred in robot R1"
Screen A→Screen D→Screen C→Screen D
Screen A→Setting Item C21
Screen A→Screen G In this case, frequency evaluation of each setting item name or each screen name may be performed for each file in a manner similar to the above, an ultimate frequency evaluation value of each setting item name or each screen name may be calculated by assigning a weight to the evaluation result of each file, and candidates may be displayed in the order of descending frequency evaluation values.

Although a single information processing apparatus 1 is described in this embodiment, the embodiment may be applied to an information processing system 10 in which a plurality of similar information processing apparatuses 1 are connected by a network 11.

Figure 7:
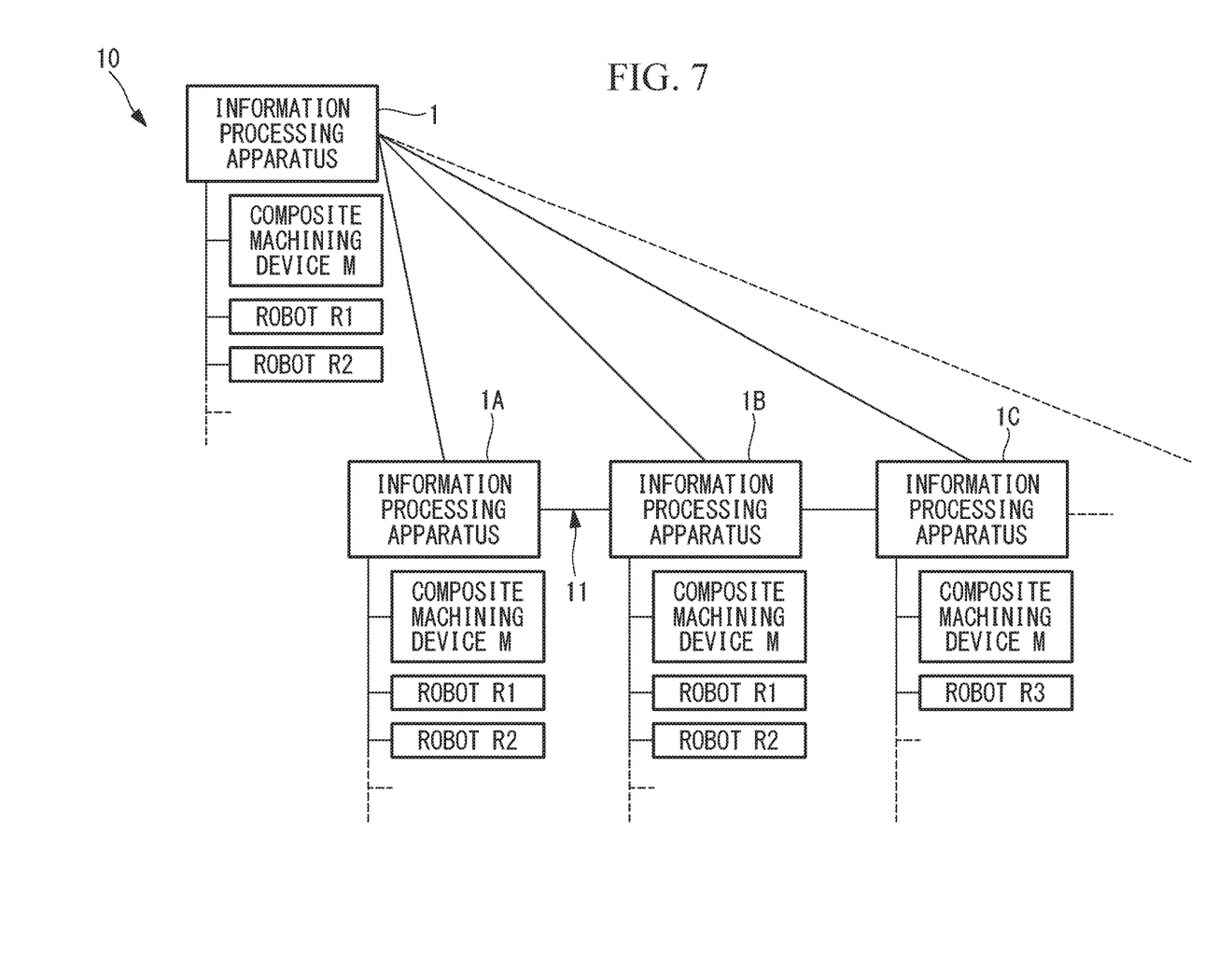
FIG. 7 illustrates an example of an information processing system according to an embodiment of the present invention.

For example, as shown in FIG. 7, in a case where information processing apparatuses 1, 1A, 1B, and 1C are connected to one another, candidates may be displayed by using screen transition histories stored in the information processing apparatus 1 operated by the user and in the remaining information processing apparatuses 1A, 1B, and 1C connected thereto via the network 11.

In this case, when the user performs a candidate displaying operation, as in step S1 and step S11 in FIG. 5, the required screen transition histories may be collected from the other information processing apparatuses, frequency evaluation of each screen may be performed by performing weighting on the basis of these histories information and the screen transition history of the currently-operated information processing apparatus, and the candidates may be displayed.

The following description relates to an example where the screen transition history is stored in association with classification information including the configuration of a mechanical system, installed location, and operational status of each device.

Screen Transition History of Information Processing Apparatus 1
Screen B→Screen A, Composite Machining Device M-Robot R1-Robot R2, Factory F0, Time of Activation
Screen B→Screen A, Composite Machining Device M-Robot R1-Robot R2, Factory F0, Time of Activation
Screen B→Screen A, Composite Machining Device M-Robot R1-Robot R2, Factory F0, Time of Activation
Screen B→Screen A, Composite Machining Device M-Robot R1-Robot R2, Factory F0, Time of Activation Screen Transition History of Information Processing Apparatus 1A
Screen B→Screen C, Composite Machining Device M-Robot R1-Robot R2, Factory F1, Time of Activation
Screen B→Screen C, Composite Machining Device M-Robot R1-Robot R2, Factory F1, Time of Activation
Screen B→Screen F, Composite Machining Device M-Robot R1-Robot R2, Factory F1, Time of Activation
Screen B→Screen C, Composite Machining Device M-Robot R1-Robot R2, Factory F1, Time of Activation Screen Transition History of Information Processing Apparatus 1B
Screen B→Screen C, Composite Machining Device M-Robot R1-Robot R2, Factory F2, Time of Activation
Screen B→Screen C, Composite Machining Device M-Robot R1-Robot R2, Factory F2, Time of Activation
Screen B→Screen F, Composite Machining Device M-Robot R1-Robot R2, Factory F2, Time of Activation
Screen B→Screen C, Composite Machining Device M-Robot R1-Robot R2, Factory F2, Time of Activation Screen Transition History of Information Processing Apparatus 1C
Screen A→Screen B→Setting Item A→Screen D, Composite Machining Device M-Robot R3, Time of Consideration for Application
Screen A→Screen B→Screen C→Screen D, Composite Machining Device M-Robot R3, Time of Consideration for Application Screen A→Screen D→Screen C→Screen D, Composite Machining Device M-Robot R3, Time of Consideration for Application Screen A→Setting Item B, Composite Machining Device M-Robot R3, Time of Consideration for Application In the above-described conditions, if the settings to use information about the factories F1 and F2 and the mechanical system configuration of "composite machining device M-robot R1-robot R2" is performed for the candidate display of the information processing apparatus 1, the candidate display is performed by using the screen transition histories of the information processing apparatuses 1A and 1B.

Consequently, even when there is not enough accumulated screen transition history, as in a newly-installed information processing apparatus 1, a target setting item or screen can be quickly reached by using the transition histories accumulated in other information processing apparatuses 1A and 1B, which is advantageous in that the time required for the setting process can be shortened. Moreover, this is also advantageous in that more accurate candidate display can be performed since the mechanism system configurations are similar to each other.

Figure 8:
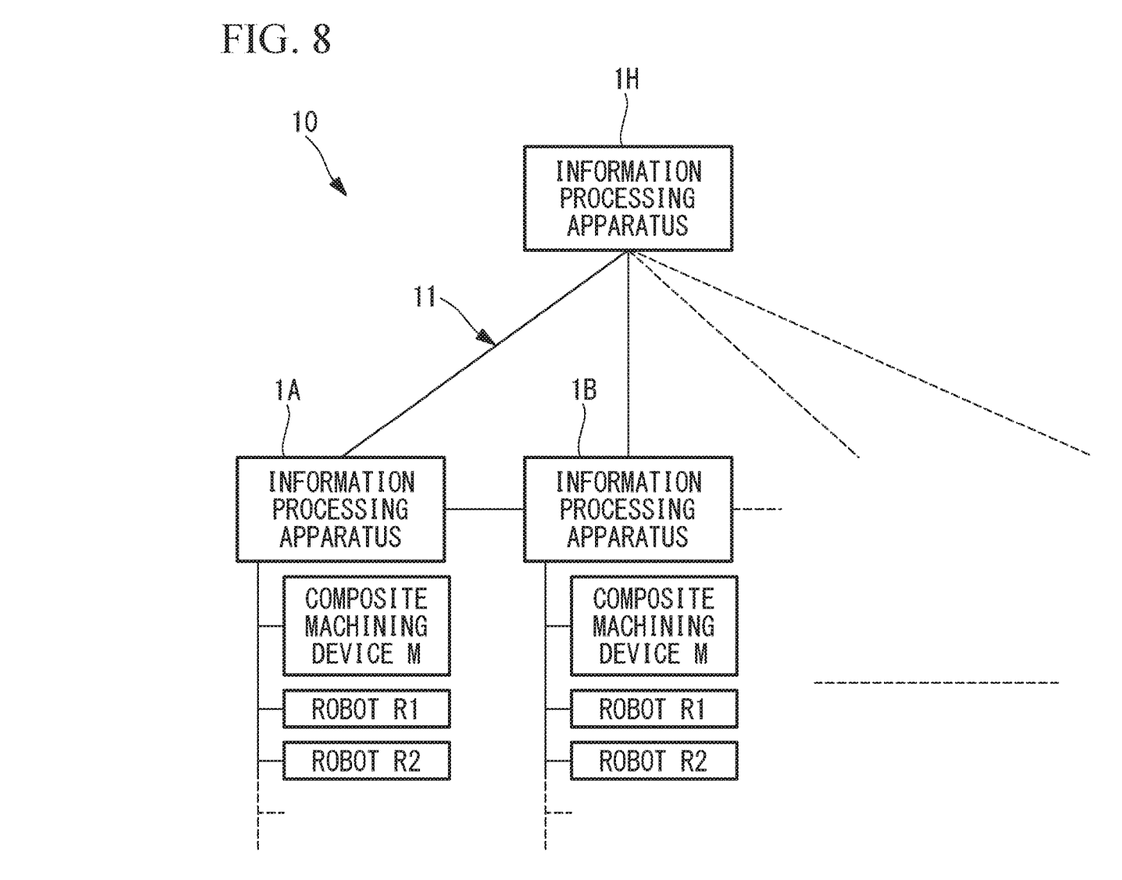
FIG. 8 illustrates another example of the information processing system in FIG. 7.

Furthermore, as shown in FIG. 8, an information processing apparatus 1H may be provided for collecting screen transition histories from the information processing apparatuses 1A and 1B connected via the network 11. Consequently, as is the case in FIG. 7, a target setting item or screen can be quickly reached by using the transition histories accumulated in other information processing apparatuses 1A and 1B. Moreover, the order of the candidate display is calculated in advance on the basis of the collected transition histories and the settings used frequently by many users, and the order of the candidate display is stored in each information processing apparatus.

In this manner, the processing time in each of the information processing apparatuses 1A, 1B, and 1H can be shortened.

Moreover, the information processing apparatus 1H may collect the screen transition histories from the information processing apparatuses 1A and 1B and store the information. Even if the information processing apparatus 1B is cut off from the network, the information processing apparatus 1H retains the screen transition histories, so that the histories can be used for the calculation to display the candidates in another information processing apparatus, for example, 1A.

Furthermore, in this embodiment, in a case where a candidate displayed in the candidate display column 8 is selected, the screen displayed at the time of selection may be deleted such that only the screen after the selection is displayed, or the screen after the selection may be displayed in a different window. Alternatively, a new tab may be formed and displayed, or the screen may be displayed in a divided fashion. If a plurality of candidates are selected, different windows, new tabs, or divided screens equal to the number of the selected candidates may be displayed.

In this embodiment, a setting item of a device connected to the information processing apparatus 1 is described as a display item. Alternatively, for example, information that cannot be changed in settings, such as an alarm status of a device, may be set as a display item. Consequently, information to be displayed can be displayed quickly even if the display item of the information to be displayed is located at a deeper hierarchical layer.

As a result, the above-described embodiment leads to the following aspects.

An aspect of the present invention provides an information processing apparatus including: a storage unit that stores a plurality of screens including at least one display item and that also stores display item names or screen names; an input unit that allows a user to perform an input; a display unit; and a control unit. The control unit causes the display unit to display a candidate of at least one of the display item names or the screen names stored in the storage unit. When the displayed display item name or screen name is selected via the input unit, the control unit searches through the storage unit for the screen including the selected display item name or the screen corresponding to the selected screen name and causes the display unit to display the screen and the storage unit to store a transition history up to the displayed screen. When the screen recorded in the transition history stored in the storage unit is being displayed, the control unit causes the display unit to display, as a candidate, the display item name included in the screen displayed subsequently to the screen being displayed on the basis of the transition history or the screen name of the screen displayed subsequently to the screen being displayed on the basis of the transition history.

According to this aspect, when the user selects the candidate displayed on the display unit, the control unit searches through the storage unit for the screen including the selected display item name or the screen corresponding to the selected screen name and causes the display unit to display the screen and the storage unit to store the transition history up to the displayed screen.

For example, when a screen B is selected from candidates displayed on a screen A, the screen B is displayed on the display unit, and a transition history "screen A→screen B" is stored in the storage unit.

When a candidate is subsequently displayed on the screen A, the control unit causes the display unit to display, as a candidate, the screen B displayed subsequently to the screen A in the transition history "screen A→screen B". Specifically, even in a case where many display items or screens are hierarchically organized, a display item name or screen name displayed as a candidate and located at a deep hierarchical layer can be simply selected without having to advance through hierarchical layers, so that the time it takes to reach a target display item or screen from many display items or screens can be shortened.

In the above aspect, the input unit may include a search input section to which at least one character is input, and the control unit may search through the storage unit for the display item name or the screen name including the character input to the search input section and cause the display unit to display the display item name or the screen name as the candidate.

Accordingly, by inputting a character of a part of the target display item name or screen name to the search input section, a display item name or screen name including the input character is searched for and is displayed as a candidate. Then, by selecting the retrieved candidate, the screen including the selected display item name or the screen corresponding to the selected screen name is searched for through the storage unit and is displayed on the display unit, and the transition history up to the displayed screen is stored in the storage unit.

For example, when a character of a part of the screen name of a target screen F is input to the search input section on a screen C and the screen F is selected from displayed candidates, the screen F is displayed on the display unit, and a transition history "screen C→screen F" is stored in the storage unit.

Consequently, when the screen C is subsequently reached, the transition history "screen C→screen F" including the screen C is searched for through the storage unit, and the screen F displayed subsequently to the displayed screen C in the transition history "screen C→screen F" is displayed as a candidate, so that the time it takes to reach the target display item or screen can be shortened.

Furthermore, in the above aspect, the information processing apparatus may further include a classification-information acquiring unit that acquires classification information including at least one of information related to the user, information related to a connected device, and information related to a timing at which the screen is displayed. The storage unit may store the transition history in association with the classification information acquired by the classification-information acquiring unit. The control unit may set the order in which the candidate is displayed on the display unit on the basis of the classification information stored in the storage unit in association with the transition history.

Accordingly, the classification information including at least one of the information related to the user, the information related to the connected device, and the information related to the timing at which the screen is displayed is acquired by the classification-information acquiring unit, and the acquired classification information is stored in the storage unit in association with the transition history. Then, the control unit sets the order in which the candidate is displayed on the basis of the classification information when the candidate is to be displayed on the display unit, so that an appropriate candidate can be preferentially displayed in accordance with the classification information.

Furthermore, in the above aspect, the control unit may calculate a selection frequency of the display item name or the screen name in the transition history stored in the storage unit on the basis of the classification information, calculate a frequency evaluation value by assigning a weight to the calculated selection frequency for each item of the classification information, and cause the display unit to display the candidate in the order of descending frequency evaluation values.

Accordingly, by setting a weight for each item of classification information in advance, priority levels are added to the items of classification information, whereby an appropriate candidate can be preferentially displayed.

Another aspect of the present invention provides an information processing system including a plurality of the aforementioned information processing apparatuses and a network that connects the information processing apparatuses. The candidate of each of the information processing apparatuses is displayed based on the one or more transition histories stored in the storage unit of each information processing apparatus connected via the network.

According to this aspect, a candidate of a display item name or screen name can be displayed in accordance with the currently-displayed screen based on the transition history stored in the storage unit of another information processing apparatus connected via the network. Consequently, even in an information processing apparatus in which a transition history is not accumulated, a target display item or screen can be reached quickly by using the transition history accumulated in another information processing apparatus.

The present invention is advantageous in that it can shorten the time it takes to reach a target display item or screen from a plurality of display items or screens, in which setting items and information about a device connected to an information processing apparatus are described.

The invention claimed is:

1. An information processing apparatus comprising:
    a storage unit that stores a plurality of screens, screen names of the plurality of screens and that also stores display item names of at least one display item included in each of the plurality of screens;
    an input unit that allows a user to perform an input, the input unit including a search input section to which a search key that is at least one character is input;
    a display unit; and
    a control unit,
    wherein, when the search key is input to the search input section, the control unit performs search through the storage unit for the display item name or the screen name including the search key and causes the display unit to display, as a candidate, the display item name or the screen name including the search key,
    wherein, when the display item name or screen name displayed via the search based on the search key input to the search input section, is selected via the input unit, the control unit searches through the storage unit for the screen including the selected display item name or the screen corresponding to the selected screen name and causes the display unit to display the screen and the storage unit to store a transition history up to the displayed screen,
    wherein, when the screen recorded in the transition history stored in the storage unit is being displayed, the control unit causes the display unit to display, as a candidate, the display item name included in the screen displayed subsequently to the screen being displayed on the basis of the transition history or the screen name of the screen displayed subsequently to the screen being displayed on the basis of the transition history, in which only the display item name or the screen name that has been selected to display a screen that has been displayed via the search based on the search key input to the search input section is stored, and
    wherein, when the displayed display item name or screen name is selected via the input unit, the control unit searches through the storage unit for the screen including the selected display item name or the screen corresponding to the selected screen name and causes the display unit to display the screen.

2. The information processing apparatus according to claim 1, further comprising:
    a classification-information acquiring unit that acquires classification information including at least one of information related to the user, information related to a connected device, and information related to a timing at which the screen is displayed,
    wherein the storage unit stores the transition history in association with the classification information acquired by the classification-information acquiring unit, and
    wherein the control unit sets the order in which the candidate is displayed on the display unit on the basis of the classification information stored in the storage unit in association with the transition history.

3. The information processing apparatus according to claim 2,
    wherein the control unit calculates a selection frequency of the display item name or the screen name in the transition history stored in the storage unit on the basis of the classification information, calculates a frequency evaluation value by assigning a weight to the calculated selection frequency for each item of the classification information, and causes the display unit to display the candidate in the order of descending frequency evaluation values.

4. An information processing system comprising:
a plurality of the information processing apparatuses according to claim 1, and
a network that connects the information processing apparatuses,
wherein the candidate of each of the information processing apparatuses is displayed on the basis of the one or more transition histories stored in the storage unit of each information processing apparatus connected via the network.

5. The information processing apparatus according to claim 2, the information processing apparatus connected to at least one device to perform setting of the device,
wherein the at least one device is selected from a computer, a robot, a machining center, a lathe, a composite machining device, a numeral control device, and a communication device, and
wherein the classification-information acquiring unit acquires information related to the device, the information related to the device including at least one of a device name, manufacturer, date of manufacture, installed location, operation start date, temperature, humidity, alarm status of each device, operational status of each device, software installed in each device, and version number of software installed in each device.

* * * * *